(12) United States Patent
Shiraishi et al.

(10) Patent No.: US 7,057,629 B1
(45) Date of Patent: Jun. 6, 2006

(54) CONTROL APPARATUS

(75) Inventors: Yasuhiro Shiraishi, Tokyo (JP); Kazuya Ohmura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/857,020

(22) PCT Filed: Oct. 20, 1999

(86) PCT No.: PCT/JP99/05795

§ 371 (c)(1),
(2), (4) Date: May 31, 2001

(87) PCT Pub. No.: WO01/29946

PCT Pub. Date: Apr. 26, 2001

(51) Int. Cl.
G09G 5/10 (2006.01)

(52) U.S. Cl. .................. 345/691; 345/211; 345/213; 324/166

(58) Field of Classification Search ............... 345/204, 345/205, 207, 697, 691, 211, 213; 318/254, 318/62; 324/166, 177; 375/275; 178/70 T; 331/40; 342/18
See application file for complete search history.

(56) References Cited

U.S. PATENT DOCUMENTS

| | | | | |
|---|---|---|---|---|
| 4,065,776 A | * | 12/1977 | Iwata et al. | 396/66 |
| 4,348,753 A | * | 9/1982 | Werner et al. | 368/188 |
| 4,355,381 A | * | 10/1982 | Fujita et al. | 368/187 |
| 4,833,358 A | * | 5/1989 | Suzuki et al. | 310/316.02 |
| 5,453,674 A | * | 9/1995 | Seki et al. | 318/573 |
| 5,675,754 A | | 10/1997 | King et al. | 395/333 |
| 5,767,609 A | * | 6/1998 | Suganuma | 310/316.02 |
| 5,777,904 A | * | 7/1998 | Schneider | 708/141 |
| 6,139,126 A | * | 10/2000 | Ayata et al. | 347/13 |
| 6,335,585 B1 | * | 1/2002 | Nagata | 310/316.01 |

FOREIGN PATENT DOCUMENTS

| | | |
|---|---|---|
| JP | 63-121411 | 5/1988 |
| JP | 4-223606 | 8/1992 |
| JP | 5-38009 | 2/1993 |
| JP | 06-242361 | 9/1994 |
| JP | 09-247948 A | 9/1997 |
| JP | 10-240303 | 9/1998 |
| WO | WO 99/40493 | 8/1999 |

OTHER PUBLICATIONS

Japanese Office Action dated Nov. 21, 2005.

* cited by examiner

Primary Examiner—Amr A. Awad
Assistant Examiner—Abbas Abdulselam
(74) Attorney, Agent, or Firm—Sughrue Mion, PLLC

(57) ABSTRACT

An object of this invention is to obtain a control apparatus capable of easily and speedily setting an output frequency, and it is constructed so as to change a change width of a frequency setting value in response to a rotational speed of a handle operation by an operator using a manual pulse generator for manually rotating a handle to generate a command pulse.

7 Claims, 5 Drawing Sheets

*FIG. 3*

| THE NUMBER OF PULSES/100ms | 1 | 2 | 3 | 4 | 5 | 6 | 7 | 8 | 9 | 10 |
|---|---|---|---|---|---|---|---|---|---|---|
| THE AMOUNT OF CHANGE IN FREQUENCY SETTING VALUE | 0.1 | 0.2 | 0.3 | 0.4 | 0.5 | 1.0 | 2.0 | 3.0 | 4.0 | 5.0 |
| SETTING MODE | NORMAL SETTING MODE ||||| ACCELERATION SETTING MODE |||||

CONTROL APPARATUS

TECHNICAL FIELD

This invention relates to a control apparatus such as an inverter apparatus or a servo driving apparatus for driving a motor at a variable speed.

BACKGROUND ART

FIG. 5 is a block diagram showing a configuration of a conventional inverter apparatus. In the drawing, numeral 10 is an inverter main circuit, and numeral 11 is a converter part for converting an AC voltage into a DC voltage, and numeral 12 is a capacitor for smoothing a DC voltage, and numeral 13 is an inverter part, which comprises a transistor and a diode, for converting a DC voltage into an AC voltage, and the inverter main circuit 10 comprises the converter part 11, the capacitor 12 and the inverter part 13. Numeral 14 is a motor driven at a variable speed by an output from the inverter part 13. Also, numeral 20 is an inverter control circuit which has an interface to the outside and controls the inverter part 13, and numeral 21 is nonvolatile memory, and numeral 22 is an operating panel for performing setting and display of a frequency or a parameter etc., and numeral 30 is a microcomputer (hereinafter referred to as CPU) which is respectively connected to the nonvolatile memory 21 and the operating panel 22 and performs various calculations based on information inputted from the operating panel 22 and information stored in the nonvolatile memory 21.

Also, the operating panel 22 comprises a display part 23 for displaying data, a key group 24 for performing a selection, a modification, a determination of data, operations of a run and a stop of the inverter apparatus and so on, and a variable resistor 25 for changing and outputting a voltage from 0 V to 5 V according to a rotation angle.

Also, in the CPU 30, numeral 31 is key input means for reading an on-off signal given from the key group 24 on the operating panel 22, and numeral 32 is variable resistance value input means for detecting and digitizing an analog value inputted from the variable resistor 25 on the operating panel 22, and numeral 33 is control panel control means for analyzing an input signal obtained from the key input means 31 and the variable resistance value input means 32 and outputting data according to an input from the outside, and numeral 34 is display means for controlling the display part 23 on the operating panel 22.

Numeral 35 is inverter control means for performing controls of a start, a stop, a change in an output frequency, etc. of the inverter apparatus by performing on-off control of the transistor of the inverter part 13 based on information obtained from the control panel control means 33, and the inverter control means creates data outputted to the display part 23 of an output frequency, an output current, etc. and delivers the data to the control panel control means 33.

Also, numeral 36 is memory communication means for reading and writing data of the nonvolatile memory 21, and the control panel control means 33 requires reading and writing of data of the nonvolatile memory 21 to the memory communication means 36 as necessary.

The CPU 30 comprises the key input means 31, the variable resistance value input means 32, the control panel control means 33, the display means 34, the inverter control means 35 and the memory communication means 36 previously constructed in the inside by software.

Next, operations of the conventional apparatus will be described.

When a voltage is supplied from a power source to the inverter apparatus, the CPU 30 reads data of the nonvolatile memory 21 by the memory communication means 36 and outputs proper data to the display part 23 by the control panel control means 33 based on information on the corresponding parameter. It is constructed so that an inverter output frequency is normally displayed on the display part 23 and the present state (run state, stop state) of the inverter apparatus or for the run state, what frequency (Hz) the inverter apparatus runs with is recognized.

When the output frequency is modified, there are two patterns of the case of making a modification with an analog value by the variable resistor 25 and the case of making a modification with a digital value by key operations of a "Δ" key and a "∇" key (not shown) in the key group 24. These two patterns of a run mode can be selected by a "run mode switching" key (not shown) in the key group 24.

When the output frequency is modified by the variable resistor 25, an analog run mode is first selected by the "run mode switching" key. The information is delivered from the key input means 31 to the operating panel 22 and a modification of the run mode is made according to an internal state of the inverter control means 35. When the variable resistor 25 is next operated (a frequency setting value increases in the case of rotating in a clockwise direction at the time of frequency setting), the variable resistance value input means 32 detects a voltage inputted from the variable resistor 25 and makes a conversion to a digital value in the inside. The digitized data is delivered to the control panel control means 33 and is converted into a setting frequency value according to calibration value data previously stored in the nonvolatile memory 21.

When the output frequency is modified by the setting in the variable resistor, the output frequency reaches a setting value at constant acceleration or deceleration time after the setting in the variable resistor, so that a phenomenon in which an overshoot occurs to a target value or an undershoot occurs in an attempt to set again further and thus it is quite difficult to set the value to the target value tended to occur. Also, when the output frequency is modified by the setting in the variable resistor, it was difficult to fix the value exactly to a round value such as 60.0 Hz.

Also, when a setting frequency is set with a digital value, in a manner similar to the above, the run mode is first switched to a digital run mode and next, a display/operation mode is modified from a monitor mode to a frequency setting mode by an operation of pressing a "MODE" key (not shown) for making a transition of a state of the operating panel and so on. Then, a value is modified by a "Δ" key and a "∇" key in the key group 24. Since the value during the modification is displayed on the display part 24 at any time, an operator modifies a setting value by pressing the "Δ" key and the "∇" key while watching the value on the display part 24 and sets the setting value to an arbitrary value and thereafter, the value is determined by an operation of pressing a "SET" key (not shown) for determining a numerical value after the modification and so on.

The control panel control means 33 reads the contents which the operator inputs by the operating panel 22 through the key input means 31 and the volume input means 32 at any time. For example, the control panel control means 33 delivers information to the inverter control means 35 when detecting that a start command of the inverter apparatus has been inputted by a signal from the key input means 31, and the inverter control means 35 starts calculations of an output frequency and an output voltage. Also, when a change in input of an analog voltage is detected by the volume input means 37, the control panel control means 33 changes a setting frequency according to an analog signal and delivers information to the inverter control means 35, and the inverter control means 35 changes an output frequency and an output voltage according to the setting frequency.

For setting of an output frequency by a key, first, the key group 24 has a "MODE" key for making a transition of mode states such as an output frequency monitor mode, a frequency setting mode or a parameter setting mode (not shown), and the key input means 31 sends the information to the control panel control means 43 whenever the "MODE" key is inputted. In the frequency setting mode, the present setting frequency is first displayed on the display part 23 and when a "Δ" key and a "∇" key are inputted, the key input means 31 measures time in which the key has been pressed or the number of times in which the key is pressed, and delivers the amount of change to the control panel control means 33. The control panel control means 33 calculates the rate of change Δf in the frequency corresponding to the amount of change, and adds the rate of change to the present setting frequency, and delivers data to the display means 34, and outputs character data converted there to the display part 23. Then, when a "SET" key having meaning of a determination in the key group 24 is inputted, the information is sent to the control panel control means 33 through the key input means 31 and the control panel control means 33 updates the setting frequency to the present data. The updated setting frequency data is delivered to the inverter control means 35, and an output frequency in response to acceleration or deceleration time is calculated every cycle time of software processing. Then, the output frequency is converted into a signal for turning on or off the transistor of the inverter part 13 inside the inverter control means 35 and is finally outputted to the inverter part 13.

In the conventional inverter apparatus as described above, there was a problem that it is difficult to fix a value exactly to a frequency setting value speedily in the case of setting of an output frequency by the variable resistor. Also, in the case of digital setting, there was a problem that it is necessary to modify a setting value by a "Δ" key and a "∇" key after switching to a frequency setting mode once.

This invention is implemented to solve the problems as described above, and an object of the invention is to easily and speedily modify an output frequency of an inverter apparatus and eliminate a fluctuation in the output frequency due to an overshoot in the case of modifying the output frequency.

Also, when a setting value is modified by a variable resistor, an object is to easily and speedily perform the operations.

DISCLOSURE OF THE INVENTION

With a control apparatus of this invention, in the control apparatus comprising a display part for displaying an output frequency and a frequency setting value, and a key group such as an operation mode selection key for selecting operation modes such as a monitor mode for displaying a run state or a setting mode for setting various data, a set key for determinating a setting value or numerical keys, and there are provided a manual pulse generator for manually rotating a handle to generate a command pulse, pulse input means for measuring a pulse outputted from this manual pulse generator and calculating the amount of change in the pulse per unit time, and control panel control means for calculating the output frequency based on the amount of change in the pulse per unit time outputted from this pulse input means, so that the output frequency can be set easily.

Also, the control panel control means can perform setting operations when data is outputted from the pulse input means even in the case that the operation modes are a mode other than the setting mode, so that there is no need to switch the operation modes to the setting mode and a setting operation of the output frequency can be performed easily.

Also, the control panel control means is constructed so as to change a scaling factor of the amount of change in the frequency setting value to the amount of change in the pulse in response to the amount of change in the pulse per unit time, so that the output frequency can be set speedily.

Further, it is constructed so as to maintain the just previous scaling factor of the amount of change in the pulse to the amount of change in the frequency setting value for a constant period of time after stopping the operation of the manual pulse generator, so that a modification can be made speedily when a setting value at the time of setting the output frequency overshoots.

Also, it is constructed so as to make a setting value set by operating the manual pulse generator valid after an input of the set key, so that a fluctuation in the output frequency due to an adjustment in the vicinity of a target setting value can be eliminated.

BRIEF DESCRIPTION OF THE DRAWINGS

FIG. 3 is a table showing a relation between the number of pulses captured during unit time and the amount of change in a numerical value of a setting frequency in a frequency setting by a manual pulse generator in the inverter apparatus according to one embodiment of this invention.

BEST MODE FOR CARRYING OUT THE INVENTION

Figure 1:
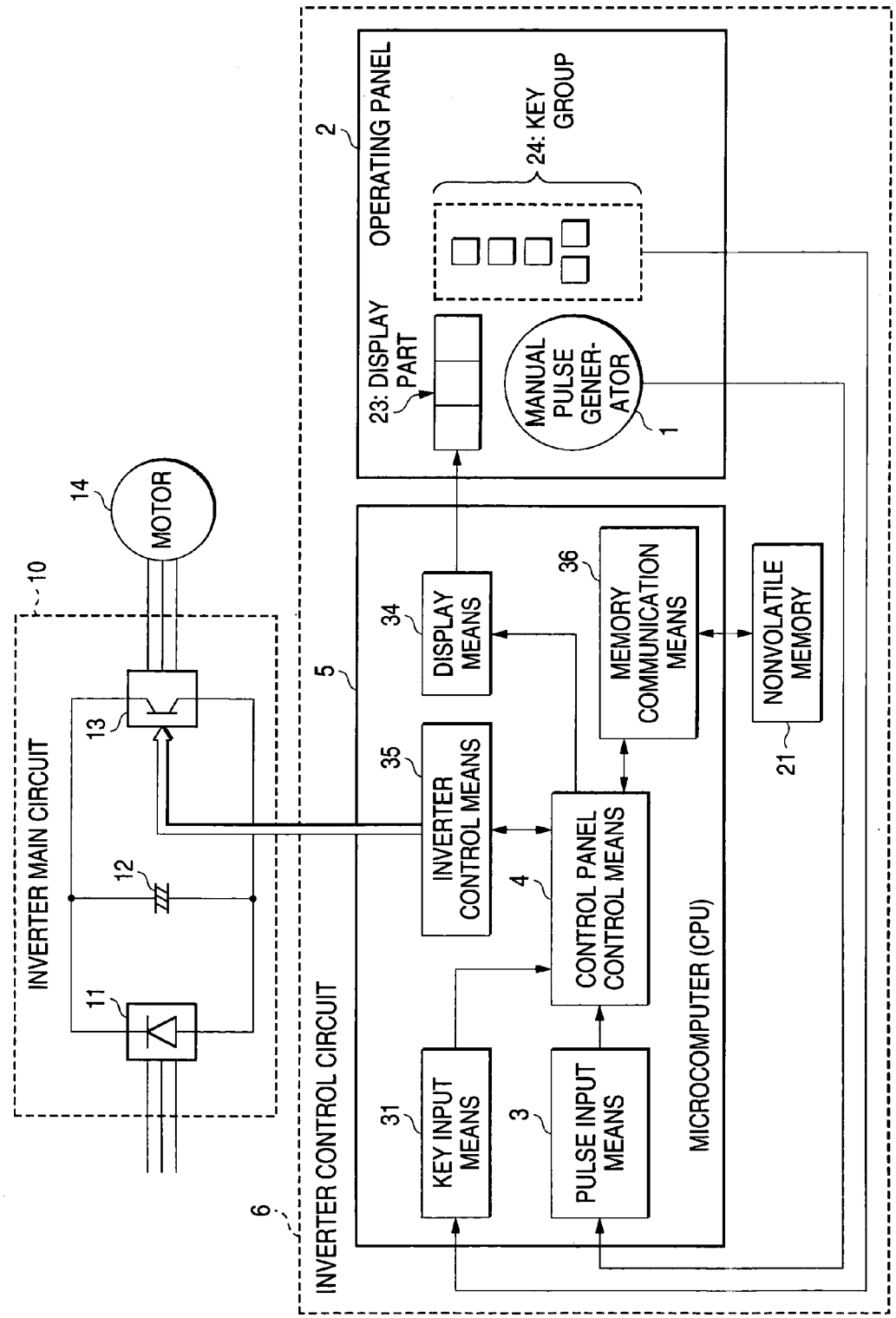
FIG. 1 is a block diagram showing a configuration of an inverter apparatus according to one embodiment of this invention.

FIG. 1 is a block diagram showing a configuration of an inverter apparatus according to one embodiment of this invention. In the drawing, numerals 10 to 14, 21, 23, 24, 31, 34 to 36 are similar to that of FIG. 5 acting as a conventional apparatus, and the description is omitted. Numeral 1 is a manual pulse generator for manually rotating a handle to generate a command pulse, and numeral 2 is an operating panel, and numeral 3 is pulse input means, and numeral 4 is control panel control means, and numeral 5 is a CPU, and numeral 6 is an inverter control circuit.

Figure 5:
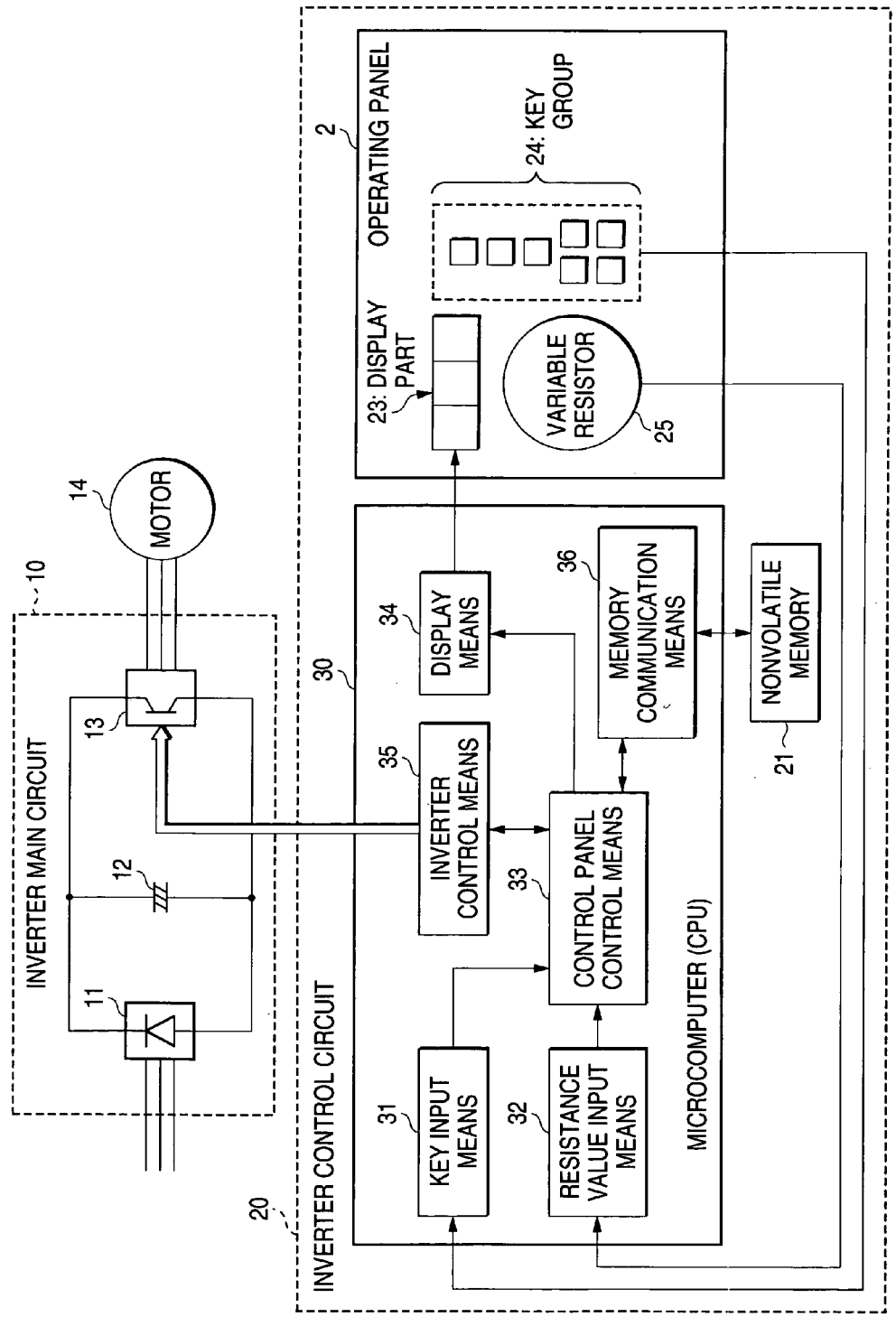
FIG. 5 is a block diagram showing a configuration of a conventional inverter apparatus.

In FIG. 1, the variable resistor 25 in FIG. 5 acting as the conventional apparatus is replaced with the manual pulse generator 1 and also in this connection, the variable resistance value input means 32 is replaced with the pulse input means 3.

The manual pulse generator 1 has an encoder for generating a pulse in response to rotation and is used so as to increase a data value by clockwise rotation and decrease a data value by counter clockwise rotation insetting of a frequency or setting of a parameter.

Next, operations will be described.

When a voltage is supplied from a power source to the inverter apparatus, the CPU 5 reads data of the nonvolatile memory 21 by the memory communication means 36 and outputs proper data to the display part 23 by the control panel control means 4 based on information on the corresponding parameter. It is constructed so that an inverter output frequency is normally displayed on the display part 23, but when the manual pulse generator 1 is rotated in order to modify an output frequency, the pulse input means 3 catches a change in a pulse and delivers information to the control panel control means 4. When the present operation mode is a monitor mode, the control panel control means 4 receives an input of the pulse from the manual pulse generator 1 and modifies the operation mode to a frequency setting mode.

Also, the pulse input means 3 measures an encoder pulse and delivers the amount of change to the control panel control means 4. The control panel control means 4 calculates the rate of change $\Delta f$ in the frequency corresponding to the amount of change, and adds the rate of change to the present setting frequency, and delivers data to the display means 34, and outputs character data converted there to the display part 23.

An operator modifies a setting value using the manual pulse generator 1 while watching the value on the display part 23, and inputs a "SET" key for determining a numerical value after the modification.

Then, setting value information at the time of inputting the "SET" key is sent to the control panel control means 4 through the key input means 31 and the control panel control means 4 updates a setting frequency to the present data. At the same time, the control panel control means 4 returns the operation mode to the monitor mode after inputting the "SET" key and delivers monitor value data to the display means 34.

The updated setting frequency data is delivered to the inverter control means 35, and an output frequency in response to acceleration or deceleration time is calculated every cycle time of software. Then, the output frequency is converted into a signal for turning on or off a transistor inside the inverter control means 35 and is finally outputted to the inverter part 13.

Figure 2:
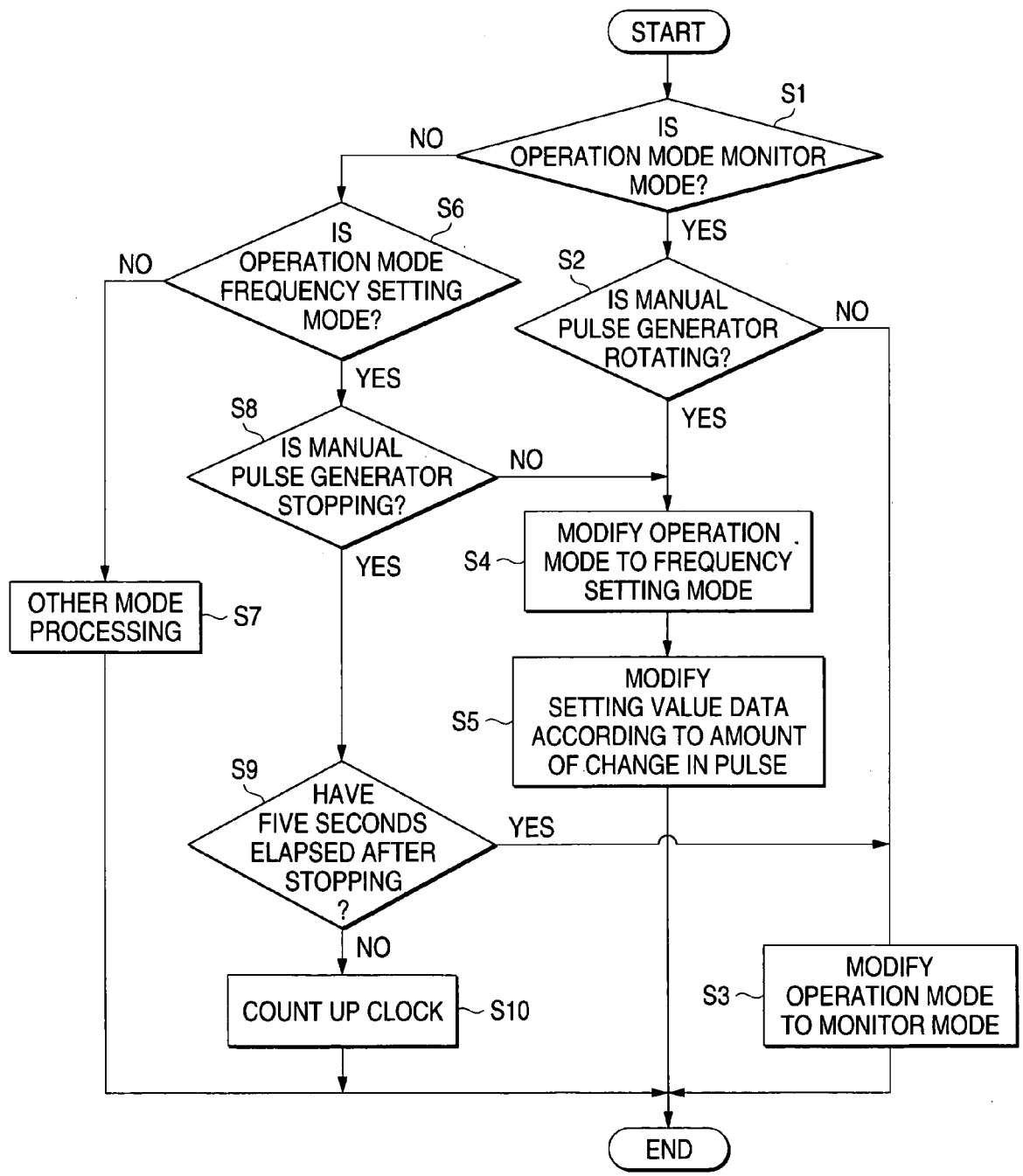
FIG. 2 is a flowchart showing processing of a frequency setting of the inverter apparatus according to one embodiment of this invention.

FIG. 2 is a flowchart showing processing of a frequency setting of the inverter apparatus according to one embodiment of this invention.

In step S1, it is checked whether the present operation mode is a monitor mode or not and if the present operation mode is the monitor mode, subsequently in step S2, it is checked whether the manual pulse generator is rotating or not. If the manual pulse generator is not rotating, the operation mode is modified to the monitor mode in step S3.

Also, if the manual pulse generator is rotating in the determination of step S2, in step S4, the operation mode is modified to a frequency setting mode and subsequently in step S5, setting value data is modified according to the amount of change in a pulse.

If the present operation mode is not the monitor mode in the determination of step S1, subsequently in step S6, it is checked whether there is a frequency setting mode or not and if there is not the frequency setting mode, other mode processing is performed in step S7. Also, if the present operation mode is the frequency setting mode in the determination of step S6, in step S8, it is checked whether the manual pulse generator is stopping or not and if the manual pulse generator is not stopping (the manual pulse generator is rotating), a flow proceeds to step S4 and the operation mode is modified to the frequency setting mode. If the manual pulse generator is stopping in the determination of step S8, subsequently in step S9, it is checked whether five seconds have elapsed after stopping an operation of the manual pulse generator or not and if the five seconds have elapsed, a flow proceeds to step S3 and the operation mode is modified to the monitor mode. If the five seconds have not elapsed after stopping an operation of the manual pulse generator in the determination of step S9, a clock is counted up in step S10.

FIG. 3 is a table showing a relation between the number of pulses captured during unit time and the amount of change in a numerical value of a setting frequency in a frequency setting by the manual pulse generator in the inverter apparatus according to one embodiment of this invention.

It is constructed so as to change the amount of change in a frequency setting value by the number of pulses captured during unit time, and in the drawing, there is shown an example in which when the number of pulses captured during unit time (the number of pulses/100 mS) is 1 to 5, as a normal setting mode, case that the number of pulses/100 mS is 1 to 5: the amount of change in the frequency setting value is set at 0.1 to 0.5, and also, when the number of pulses captured during unit time (the number of pulses/100 mS) is 6 to 10, as an acceleration setting mode, case that the number of pulses/100 mS is 6: the amount of change in the frequency setting value is set at 1.0, case that the number of pulses/100 mS is 7: the amount of change in the frequency setting value is set at 2.0, case that the number of pulses/100 mS is 8: the amount of change in the frequency setting value is set at 3.0, case that the number of pulses/100 mS is 9: the amount of change in the frequency setting value is set at 4.0, case that the number of pulses/100 mS is 10:the amount of change in the frequency setting value is set at 5.0.

In the control panel control means 4, the rate of change $\Delta f$ in the frequency is proportional to a speed at which a dial of the manual pulse generator is turned, that is, the number of pulses captured during unit time, and it is constructed so that only a change is made by 0.1 Hz (normal setting mode) when the manual pulse generator 1 is slowly turned (for example, the case that the number of pulses/100 mS is 1 in FIG. 3), but the amount of change is increased according to the speed (acceleration setting mode) when the manual pulse generator 1 is quickly turned (for example, the case that the number of pulses/100 mS is 6 to 10 in FIG. 3).

Figure 4:
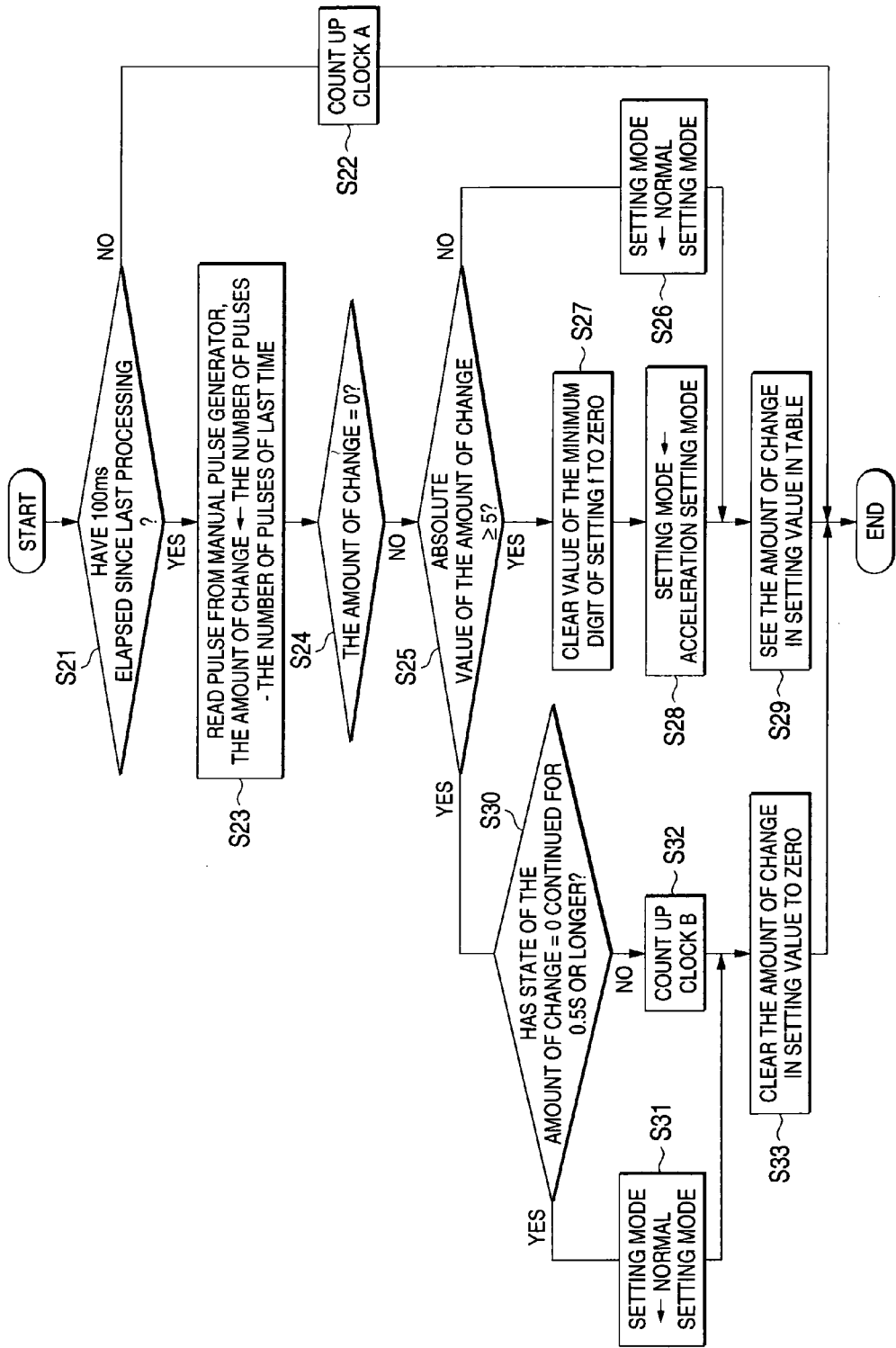
FIG. 4 is a flowchart showing frequency setting processing in the inverter apparatus according to one embodiment of this invention.

FIG. 4 is a flowchart showing frequency setting processing in the inverter apparatus according to one embodiment of this invention.

In step S21, it is checked whether 100 mS have elapsed since the last processing or not and if there is shorter than 100 mS since the last processing, a clock A is counted up in step S22.

If 100 mS have elapsed since the last processing in the check of step S21, in step S23, pulses are read from the manual pulse generator 1 and the following expression is calculated.

The amount of change=the number of pulses of this time−the number of pulses of last time In step S24, it is checked whether the amount of change is present or absent and if the amount of change $\neq 0$, subsequently in step S25, it is checked whether an absolute value of the amount of change≧6 or not and if the absolute value of the amount of change<6, a setting mode is modified to a normal setting mode in step S26.

If the absolute value of the amount of change≧6 in the determination of step S25, in step S27, a value of the minimum digit of a setting frequency f is cleared to zero and in step S28, the setting mode is modified to an acceleration setting mode.

In an output frequency in the actual inverter apparatus, the case of setting a numerical value having no fraction such as 60.0 Hz is larger than the case of setting a numerical value having a fraction such as 60.3 Hz, so that a value of a table seen simply is not added simply and after a fraction is first discarded, a transition is made to the acceleration setting mode and a numerical value having no fraction is added.

In step S29, the amount of change in a setting value is seen in the table.

If the amount of change=0 in the determination of step S24, subsequently in step S30, it is checked whether a state of the amount of change=0 has continued for 0.5 s or longer or not and if the state of the amount of change=0 has continued for 0.5 s or longer, the setting mode is modified to the normal setting mode in step S31.

If the state of the amount of change=0 has continued for shorter than 0.5 s in the determination of step S30, in step S32, a clock B is counted up and in step S33, the amount of change in the setting value is cleared to zero.

When a numerical value with a large target value (for example, 60 Hz) is set using the manual pulse generator 1, an acceleration setting mode with a large amount of change per scale of a dial is used. In step S30, even when rotation of a dial of the manual pulse generator 1 stops after proceeding to the acceleration setting mode, if the state of the amount of change=0 has continued for shorter than 0.5 s, it is constructed so as to maintain the acceleration setting mode, so that even in case of exceeding a target value by an operation of the manual pulse generator 1, a return from the overshot point to 60 Hz of the target value can speedily be made at the amount of change in the setting value of the acceleration setting mode.

In the above description, the example of the inverter apparatus as a control apparatus has been described, but it is similar also in a servo driving apparatus.

INDUSTRIAL APPLICABILITY

As described above, the present invention is suitable for use in applications of setting the amount of change in an output frequency etc. in a control apparatus such as an inverter apparatus or a servo driving apparatus for driving a motor at a variable speed.

The invention claimed is:

1. A control apparatus for controlling a device-under-control, the control apparatus comprising:
    a display part operable to display an output frequency and a frequency setting value;
    a key group operable to select at least one mode from a plurality of operation modes;
    a pulse generator operable to generate one or more command pulses;
    pulse input means for receiving the command pulses outputted from said pulse generator and calculating an amount of change in the received command pulses per unit time; and
    control panel control means for calculating the output frequency based on the amount of change in the command pulses per unit time outputted from said pulse input means.

2. A control apparatus as defined in claim 1, wherein the operation modes comprise at least a setting mode in which the frequency setting value can be changed and wherein further, said control panel control means is operable to perform setting operations when data is outputted from said pulse input means even when the selected operation mode is a mode other than the setting mode.

3. A control apparatus as defined in claim 1, wherein said control panel control means is operable to change a scaling factor of an amount of change of the frequency setting value to the amount of change in the command pulses in response to the amount of change in the command pulses per unit time.

4. A control apparatus as defined in claim 3, wherein the scaling factor is held constant for a fixed period of time after operation of said pulse generator is stopped.

5. A control apparatus as defined in claim 1, wherein a setting value is set by operating said pulse generator after a set key has been selected on said key group.

6. A control device for controlling a frequency property of a device under control, the control device comprising:
    an operating component operable to display operational properties of the device under control, input control parameters, and output property control signals, wherein said operating component comprises a pulse generator operable to generate a control pulse signal comprising pulses with a frequency determined by a rotation amount of the pulse generator; and,
    a control circuit operable to receive the property control signals and generate frequency property control signals based thereon for controlling the frequency property of the device under control and output display signals to said operating component, wherein said control circuit comprises a pulse input device operable to receive the control pulse signal and determine a change in the frequency of the pulses.

7. A control device as set forth in claim 6, wherein the change in frequency of the pulses of the control pulse signal is used to generate the frequency property control signals.

* * * * *